(12) United States Patent
Zhang et al.

(10) Patent No.: US 9,769,721 B2
(45) Date of Patent: Sep. 19, 2017

(54) CHANNEL SWITCHING METHOD, APPARATUS, AND DEVICE

(71) Applicant: HUAWEI DEVICE CO., LTD., Shenzhen (CN)

(72) Inventors: Kui Zhang, Xi'an (CN); Xinzheng Yao, Xi'an (CN); Peng Zhao, Xi'an (CN)

(73) Assignee: HUAWEI DEVICE CO., LTD., Shenzhen (CN)

(*) Notice: Subject to any disclaimer, the term of this patent is extended or adjusted under 35 U.S.C. 154(b) by 47 days.

(21) Appl. No.: 14/570,396

(22) Filed: Dec. 15, 2014

(65) Prior Publication Data

US 2015/0098430 A1  Apr. 9, 2015

Related U.S. Application Data

(63) Continuation of application No. PCT/CN2013/084741, filed on Sep. 30, 2013.

(51) Int. Cl.
*H04W 4/00* (2009.01)
*H04W 36/06* (2009.01)
(Continued)

(52) U.S. Cl.
CPC .......... *H04W 36/06* (2013.01); *H04W 16/14* (2013.01); *H04W 88/08* (2013.01)

(58) Field of Classification Search
CPC .......................... H04W 72/12; H04W 72/1231
(Continued)

(56) References Cited

U.S. PATENT DOCUMENTS 8,830,971 B1 * 9/2014 Shipley ................ H04W 84/12
  370/338
9,320,019 B2 * 4/2016 Gallagher ............. H04W 72/04
(Continued)

FOREIGN PATENT DOCUMENTS

CN  101472299  7/2009
CN  102724727  10/2012
(Continued)

OTHER PUBLICATIONS

Japanese Office Action dated Feb. 23, 2016 in corresponding Japanese Patent Application No. 2015-538267.
(Continued)

*Primary Examiner* — Farah Faroul
(74) *Attorney, Agent, or Firm* — Staas & Halsey LLP (57) ABSTRACT

Embodiments of the present invention provide a channel switching method, apparatus, and device. The method includes: obtaining, by a mobile Wi-Fi device, a channel switching instruction sent by a Wi-Fi access point, where the channel switching instruction carries a destination channel identifier; and switching, by the mobile Wi-Fi device according to the channel switching instruction, a communication channel between the mobile Wi-Fi device and the Wi-Fi access point, and a communication channel between the mobile Wi-Fi device and a terminal that accesses the mobile Wi-Fi device to a destination communication channel corresponding to the destination channel identifier carried in the channel switching instruction. In this way, a Wi-Fi client and a Wi-Fi access end of a mobile Wi-Fi device still work on a same communication channel after performing channel switching, thereby improving compatibility, a throughput, and stability of the mobile Wi-Fi device.

19 Claims, 4 Drawing Sheets

---

A mobile Wi-Fi device obtains a channel switching instruction sent by a Wi-Fi access point in a network, where the channel switching instruction carries a destination channel identifier of a destination communication channel that needs to be switched to  — 301

The mobile Wi-Fi device switches, according to the channel switching instruction, a communication channel between the mobile Wi-Fi device and the Wi-Fi access point, and a communication channel between the mobile Wi-Fi device and a terminal that accesses the mobile Wi-Fi device to the destination communication channel corresponding to the destination channel identifier  — 302

(51) Int. Cl.
*H04W 16/14* (2009.01)
*H04W 88/08* (2009.01)

(58) Field of Classification Search
USPC .......................................................... 370/331
See application file for complete search history.

(56) References Cited

U.S. PATENT DOCUMENTS

| | | | |
|---|---|---|---|
| 2005/0069225 A1* | 3/2005 | Schneider | H04N 21/234318 |
| | | | 382/305 |
| 2008/0101311 A1* | 5/2008 | Bernhard | H04W 36/24 |
| | | | 370/342 |
| 2009/0201851 A1 | 8/2009 | Kruys et al. | |
| 2010/0222053 A1* | 9/2010 | GiriSrinivasaRao | H04W 24/08 |
| | | | 455/432.1 |
| 2011/0292897 A1* | 12/2011 | Wu | H04W 72/0486 |
| | | | 370/329 |
| 2012/0314663 A1 | 12/2012 | Dwivedi et al. | |
| 2013/0272227 A1* | 10/2013 | Gallagher | H04W 16/02 |
| | | | 370/329 |
| 2013/0288675 A1* | 10/2013 | Gassend | H04W 76/045 |
| | | | 455/434 |
| 2013/0336140 A1 | 12/2013 | Ma | |
| 2014/0029428 A1* | 1/2014 | Lin | H04L 5/0048 |
| | | | 370/235 |
| 2014/0036705 A1* | 2/2014 | Ma | H04W 28/0231 |
| | | | 370/252 |
| 2014/0141732 A1 | 5/2014 | Medapalli et al. | |
| 2015/0222410 A1* | 8/2015 | Belghoul | H04W 28/085 |
| | | | 370/252 |
| 2015/0282195 A1* | 10/2015 | Farhadi | H04W 72/085 |
| | | | 370/229 |
| 2016/0014824 A1* | 1/2016 | Xiang | H04W 48/10 |
| | | | 370/329 |

FOREIGN PATENT DOCUMENTS

| | | |
|---|---|---|
| CN | 102917406 | 2/2013 |
| EP | 2 187 675 A1 | 5/2010 |
| JP | 2001-285186 | 10/2001 |
| JP | 2003-259429 | 9/2003 |
| JP | 2009-188536 | 8/2009 |
| JP | 2011-101311 | 5/2011 |
| JP | 2012-10260 | 1/2012 |
| KR | 10-1221552 | 1/2013 |
| WO | 2009/031282 A1 | 3/2009 |

OTHER PUBLICATIONS

PCT International Search Report dated Jul. 3, 2014 in corresponding International Patent Application No. PCT/CN2013/084741.
Extended European Search Report dated Jul. 6, 2015 in corresponding European Patent Application No. 13886164.6.
Japanese Office Action dated Oct. 4, 2016 in corresponding Japanese Patent Application No. 2015-538267, 9 pages.

* cited by examiner

```
┌─────────────────────────────────────────────────────────────┐
│ A mobile Wi-Fi device receives a termination instruction    │──── 401
│ that is sent by a Wi-Fi access point in a network and used  │
│ for instructing the mobile Wi-Fi device to stop sending data│
└─────────────────────────────────────────────────────────────┘

┌─────────────────────────────────────────────────────────────┐
│ The mobile Wi-Fi device terminates, according to the        │──── 402
│ termination instruction, data transmission performed by the │
│ mobile Wi-Fi device on a communication channel between the  │
│ mobile Wi-Fi device and the Wi-Fi access point.             │
└─────────────────────────────────────────────────────────────┘

┌─────────────────────────────────────────────────────────────┐
│ The mobile Wi-Fi device sends the termination instruction   │──── 403
│ to a terminal that accesses the mobile Wi-Fi device, so as  │
│ to instruct the terminal to stop transmitting data on a     │
│ communication channel on which the terminal communicates    │
│ with the mobile Wi-Fi device.                               │
└─────────────────────────────────────────────────────────────┘

┌─────────────────────────────────────────────────────────────┐
│ The mobile Wi-Fi device obtains a channel switching         │──── 404
│ instruction sent by the Wi-Fi access point in the network,  │
│ where the channel switching instruction carries a           │
│ destination channel identifier of a destination             │
│ communication channel that needs to be switched to          │
└─────────────────────────────────────────────────────────────┘
                              ↓
┌─────────────────────────────────────────────────────────────┐
│ The mobile Wi-Fi device switches, according to the channel  │
│ switching instruction, the communication channel between    │
│ the mobile Wi-Fi device and the Wi-Fi access point, and the │──── 405
│ communication channel between the mobile Wi-Fi device and   │
│ the terminal that accesses the mobile Wi-Fi device to the   │
│ destination communication channel corresponding to the      │
│ destination channel identifier                              │
└─────────────────────────────────────────────────────────────┘
```

CHANNEL SWITCHING METHOD, APPARATUS, AND DEVICE

CROSS-REFERENCE

The present application is a continuation of International Application No. PCT/CN2013/084741, filed on Sep. 30, 2013, which is incorporated herein by reference in its entirety.

TECHNICAL FIELD

The present invention relates to the field of communications technologies, and in particular, to a channel switching method, apparatus, and device.

BACKGROUND

Figure 1:
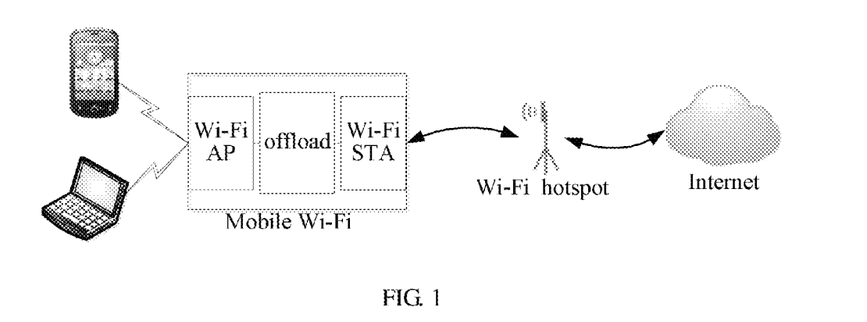
FIG. 1 is a schematic diagram of interaction of a conventional mobile Wi-Fi device in a network.

Along with popularization of 5G Wi-Fi networks at present, application of 5G Wi-Fi products becomes increasingly extensive. Currently, both the Conformity European (CE, Conformity European) and the Federal Communications Commission (FCC, Federal Communications Commission) require that, when used on some channels, 5G Wi-Fi should support a dynamic frequency selection (DFS, Dynamic Frequency Selection) function. In addition, the CE and FCC currently categorize Wi-Fi devices into wireless local area network access ends (Wi-Fi AP, Wi-Fi Access Point) and wireless local area network clients (Wi-Fi STA, Wi-Fi Station). A general application scenario is shown in FIG. 1. A Wi-Fi access point (namely, a Wi-Fi hotspot) in FIG. 1 detects a radar signal; and after discovering interference, instructs an accessed mobile Wi-Fi device (namely, a Mobile Wi-Fi in FIG. 1) to stop data information transmission. The Mobile Wi-Fi migrates a channel between the Mobile Wi-Fi and the Wi-Fi hotspot, and a channel between the Mobile Wi-Fi and a terminal device according to a dynamic frequency selection standard.

However, for a current Mobile Wi-Fi device, channels are migrated independently; as a result, the Mobile Wi-Fi device has problems in compatibility, a throughput, and stability.

SUMMARY

Embodiments of the present invention provide a channel switching method, apparatus, and device, which are used to solve the problem that compatibility, a throughput, and stability of a Mobile Wi-Fi in the prior art are all poor.

Specific technical solutions of the embodiments of the present invention are as follows:

A first aspect of the embodiments of the present invention provides a channel switching method, including:

obtaining, by a mobile Wi-Fi device, a channel switching instruction sent by a Wi-Fi access point in a network, where the channel switching instruction carries a destination channel identifier; and switching, by the mobile Wi-Fi device according to the channel switching instruction, a communication channel between the mobile Wi-Fi device and the Wi-Fi access point, and a communication channel between the mobile Wi-Fi device and a terminal that accesses the mobile Wi-Fi device to a destination communication channel corresponding to the destination channel identifier carried in the channel switching instruction.

With reference to the first aspect, in a first possible implementation manner, the switching, by the mobile Wi-Fi device according to the channel switching instruction, a communication channel between the mobile Wi-Fi device and the Wi-Fi access point, and a communication channel between the mobile Wi-Fi device and a terminal that accesses the mobile Wi-Fi device to a destination communication channel corresponding to the destination channel identifier includes:

controlling, by the mobile Wi-Fi device according to the channel switching instruction, the communication channel between the mobile Wi-Fi device and the Wi-Fi access point to be switched to the destination communication channel corresponding to the destination channel identifier, and generating a switching completion signal; and switching, by the mobile Wi-Fi device according to the switching completion signal, the communication channel between the mobile Wi-Fi device and the terminal that accesses the mobile Wi-Fi device to the destination communication channel corresponding to the destination channel identifier.

With reference to the first aspect, in a second possible implementation manner, the switching, by the mobile Wi-Fi device according to the channel switching instruction, a communication channel between the mobile Wi-Fi device and the Wi-Fi access point, and a communication channel between the mobile Wi-Fi device and a terminal that accesses the mobile Wi-Fi device to a destination communication channel corresponding to the destination channel identifier includes:

controlling, by the mobile Wi-Fi device according to the channel switching instruction, the communication channel between the mobile Wi-Fi device and the Wi-Fi access point to be switched to the destination communication channel corresponding to the destination channel identifier; and at the same time controlling the communication channel between the mobile Wi-Fi device and the terminal that accesses the mobile Wi-Fi device to be switched to the destination communication channel corresponding to the destination channel identifier.

With reference to the first aspect, the first possible implementation manner of the first aspect, or the second possible implementation manner of the first aspect, in a third possible implementation manner, before the obtaining, by a mobile Wi-Fi device, a channel switching instruction sent by a Wi-Fi access point in a network, the method further includes:

receiving, by the mobile Wi-Fi device, a termination instruction that is sent by the Wi-Fi access point in the network and used for instructing the mobile Wi-Fi device to stop transmitting data; and terminating, by the mobile Wi-Fi device according to the termination instruction, data transmission performed by the mobile Wi-Fi device on the communication channel between the mobile Wi-Fi device and the Wi-Fi access point.

With reference to the third possible implementation manner, in a fourth possible implementation manner, after the terminating, by the mobile Wi-Fi device according to the termination instruction, data transmission performed by the mobile Wi-Fi device on the communication channel between the mobile Wi-Fi device and the Wi-Fi access point, the method further includes:

sending the termination instruction to the terminal that accesses the mobile Wi-Fi device, so as to instruct the terminal to stop transmitting data on the communication channel on which the terminal communicates with the mobile Wi-Fi device.

With reference to the first aspect, the first possible implementation manner of the first aspect, the second possible implementation manner of the first aspect, the third possible implementation manner of the first aspect, or the fourth possible implementation manner of the first aspect, in a fifth possible implementation manner, after the switching, by the mobile Wi-Fi device according to the channel switching instruction, a communication channel between the mobile Wi-Fi device and the Wi-Fi access point, and a communication channel between the mobile Wi-Fi device and a terminal that accesses the mobile Wi-Fi device to a destination communication channel corresponding to the destination channel identifier, the method further includes:

sending, by the mobile Wi-Fi device, information including the destination channel identifier to the terminal that accesses the mobile Wi-Fi device, where the information is used to instruct the terminal to switch from the communication channel on which the terminal communicates with the mobile Wi-Fi device to the destination communication channel corresponding to the destination channel identifier.

A second aspect of the embodiments of the present invention provides a channel switching apparatus, including:

an obtaining module, configured to obtain, by using a receiver in a mobile Wi-Fi device, a channel switching instruction sent by a Wi-Fi access point in a network, where the channel switching instruction carries a destination channel identifier; and a processing module, configured to switch, according to the channel switching instruction, a communication channel between the mobile Wi-Fi device and the Wi-Fi access point, and a communication channel between the mobile Wi-Fi device and a terminal that accesses the mobile Wi-Fi device to a destination communication channel corresponding to the destination channel identifier carried in the channel switching instruction.

With reference to the second aspect, in a first possible implementation manner, the processing module includes:

a control unit, configured to control, according to the channel switching instruction, the communication channel between the mobile Wi-Fi device and the Wi-Fi access point to be switched to the destination communication channel corresponding to the destination channel identifier, and generate a switching completion signal; and a switching unit, configured to switch, according to the switching completion signal, the communication channel between the mobile Wi-Fi device and the terminal that accesses the mobile Wi-Fi device to the destination communication channel corresponding to the destination channel identifier.

With reference to the second aspect, in a second possible implementation manner, the processing module is further configured to: control, according to the channel switching instruction, the communication channel between the mobile Wi-Fi device and the Wi-Fi access point to be switched to the destination communication channel corresponding to the destination channel identifier; and at the same time control the communication channel between the mobile Wi-Fi device and the terminal that accesses the mobile Wi-Fi device to be switched to the destination communication channel corresponding to the destination channel identifier.

With reference to the second aspect, in a third possible implementation manner, the obtaining module is further configured to receive, by using the receiver in the mobile Wi-Fi device, a termination instruction that is sent by the Wi-Fi access point in the network and used for instructing the mobile Wi-Fi device to stop transmitting data; and the processing module is further configured to terminate, according to the termination instruction, data transmission performed by the mobile Wi-Fi device on the communication channel between the mobile Wi-Fi device and the Wi-Fi access point.

With reference to the third possible implementation manner, in a fourth possible implementation manner, the processing module is further configured to send the termination instruction to the terminal that accesses the mobile Wi-Fi device, so as to instruct the terminal to stop transmitting data on the communication channel on which the terminal communicates with the mobile Wi-Fi device.

With reference to the second aspect, the first possible implementation manner of the second aspect, the second possible implementation manner of the second aspect, the third possible implementation manner of the second aspect, or the fourth possible implementation manner of the second aspect, in a fifth possible implementation manner, the processing module is further configured to send information including the destination channel identifier to the terminal that accesses the mobile Wi-Fi device, where the information is used to instruct the terminal to switch from the communication channel on which the terminal communicates with the mobile Wi-Fi device to the destination communication channel corresponding to the destination channel identifier.

A third aspect of the embodiments of the present invention provides a mobile Wi-Fi device, including:

a receiver, configured to obtain a channel switching instruction sent by a Wi-Fi access point in a network, where the channel switching instruction carries a destination channel identifier; and a Wi-Fi processing chip, connected to the receiver and configured to switch, according to the channel switching instruction, a communication channel between the mobile Wi-Fi device and the Wi-Fi access point, and a communication channel between the Wi-Fi device and a terminal that accesses the mobile Wi-Fi device to a destination communication channel corresponding to the destination channel identifier carried in the channel switching instruction.

With reference to the third aspect, in a first possible implementation manner, the Wi-Fi processing chip is further configured to: control, according to the channel switching instruction, the communication channel between the mobile Wi-Fi device and the Wi-Fi access point to be switched to the destination communication channel corresponding to the destination channel identifier, and generate a switching completion signal; and switch, according to the switching completion signal, the communication channel between the mobile Wi-Fi device and the terminal that accesses the mobile Wi-Fi device to the destination communication channel corresponding to the destination channel identifier.

With reference to the third aspect, in a second possible implementation manner, the Wi-Fi processing chip is further configured to: control, according to the channel switching instruction, the communication channel between the mobile Wi-Fi device and the Wi-Fi access point to be switched to the destination communication channel corresponding to the destination channel identifier; and control the communication channel between the mobile Wi-Fi device and the terminal that accesses the mobile Wi-Fi device to be switched to the destination communication channel corresponding to the destination channel identifier.

With reference to the third aspect, the first possible implementation manner of the third aspect, or the second possible implementation manner of the third aspect, in a third possible implementation manner, the receiver is further configured to receive a termination instruction that is sent by the Wi-Fi access point in the network and used for instructing the mobile Wi-Fi device to stop sending data; and the Wi-Fi processing chip is further configured to terminate, according to the termination instruction, data transmission performed by the mobile Wi-Fi device on the communication channel between the mobile Wi-Fi device and the Wi-Fi access point.

With reference to the third aspect, the first possible implementation manner of the third aspect, the second possible implementation manner of the third aspect, or the third possible implementation manner of the third aspect, in a fourth possible implementation manner, the Wi-Fi processing chip is further configured to send information including the destination channel identifier to the terminal that accesses the mobile Wi-Fi device, where the information is used to instruct the terminal to switch from the communication channel on which the terminal communicates with the mobile Wi-Fi device to the destination communication channel corresponding to the destination channel identifier.

With reference to the third aspect, in a fifth possible implementation manner, the mobile Wi-Fi device has a single Wi-Fi processing chip, and the Wi-Fi processing chip is disposed on the Wi-Fi chip.

In the embodiments of the present invention, a mobile Wi-Fi device obtains a channel switching instruction sent by a Wi-Fi access point in a network, where the channel switching instruction carries a destination channel identifier; and the mobile Wi-Fi device switches, according to the channel switching instruction, a communication channel between the mobile Wi-Fi device and the Wi-Fi access point, and a communication channel between the mobile Wi-Fi device and a terminal that accesses the mobile Wi-Fi device to a destination communication channel corresponding to the destination channel identifier carried in the channel switching instruction, which avoids the problem that a Wi-Fi client and a Wi-Fi access end of a mobile Wi-Fi device are switched to different communication channels when channel switching is performed. The Wi-Fi client and Wi-Fi access end of the mobile Wi-Fi device then still work on a same communication channel after performing the channel switching, thereby improving compatibility, a throughput, and stability of the mobile Wi-Fi device.

DESCRIPTION OF EMBODIMENTS

Figure 2:
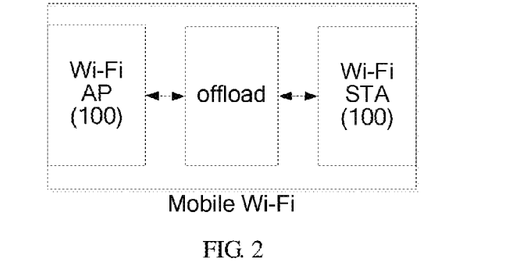
FIG. 2 is a schematic structural diagram of a conventional mobile Wi-Fi device.

A mobile Wi-Fi device (Mobile Wi-Fi for short in the following) in embodiments of the present invention may serve as a Wi-Fi client (Wi-Fi STA) and a Wi-Fi access point (Wi-Fi AP). As shown in FIG. 1 to FIG. 2, a Mobile Wi-Fi in FIG. 2 has functions of both a Wi-Fi AP and a Wi-Fi STA.

As shown in FIG. 1, the Mobile Wi-Fi can access a Wi-Fi hotspot in a network by using the Wi-Fi STA, and as a result, the Mobile Wi-Fi is connected to the network (Internet) by using the Wi-Fi hotspot. The Wi-Fi AP is used for communication between the Mobile Wi-Fi and a terminal that accesses the Mobile Wi-Fi.

When the Wi-Fi hotspot in the network instructs the Mobile Wi-Fi to perform channel switching, the Wi-Fi AP and the Wi-Fi STA in the Mobile Wi-Fi need to perform channel switching. The Wi-Fi AP and Wi-Fi STA perform dynamic frequency selection separately, and a result of the performing may cause the Wi-Fi AP and Wi-Fi STA in the Mobile Wi-Fi to work on different communication channels. As a result, the Mobile Wi-Fi encounters problems of poor compatibility, a poor throughput, and poor stability.

To solve the foregoing problems, a Wi-Fi STA in a Mobile Wi-Fi in an embodiment of the present invention detects in real time whether a channel switching instruction sent by a Wi-Fi hotspot in a network is received. When the Wi-Fi STA in the Mobile Wi-Fi receives the channel switching instruction, the Mobile Wi-Fi switches a communication channel between the Mobile Wi-Fi and the Wi-Fi hotspot, and a communication channel between the Mobile Wi-Fi and a terminal that accesses the Mobile Wi-Fi to a destination communication channel corresponding to a destination channel identifier. In other words, the channel between the Mobile Wi-Fi and the terminal and the channel between the Mobile Wi-Fi and the Wi-Fi hotspot in the network are switched to a same communication channel.

The following describes the technical solutions of the present invention in detail with reference to the accompanying drawings and specific embodiments.

Figure 3:
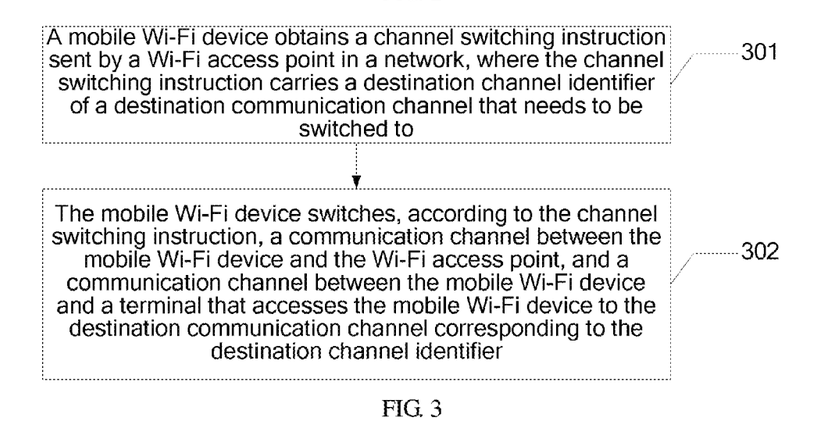
FIG. 3 is a flowchart of a channel switching method according to an embodiment of the present invention.

To solve the problems of poor compatibility, a poor throughput, and poor stability of a Mobile Wi-Fi in the prior art, this embodiment of the present invention provides a channel switching method. FIG. 3 is a flowchart of the channel switching method according to the embodiment of the present invention. The method includes:

S301: A mobile Wi-Fi device obtains a channel switching instruction sent by a Wi-Fi access point in a network, where the channel switching instruction carries a destination channel identifier of a destination communication channel that needs to be switched to.

S302: The mobile Wi-Fi device switches, according to the channel switching instruction, a communication channel between the mobile Wi-Fi device and the Wi-Fi access point, and a communication channel between the mobile Wi-Fi device and a terminal that accesses the mobile Wi-Fi device to the destination communication channel corresponding to the destination channel identifier.

In the embodiment of the present invention, the mobile Wi-Fi switches a channel between the Mobile Wi-Fi and a terminal, and a channel between the Mobile Wi-Fi and a Wi-Fi hotspot in a network to a same communication channel, thereby solving the problems of poor compatibility, a poor throughput, and poor stability of the Mobile Wi-Fi.

Specifically, when the Mobile Wi-Fi is in a time division state (offload), a Wi-Fi STA of the Mobile Wi-Fi switches from a communication channel, which the Wi-Fi STA is currently on, to the destination communication channel corresponding to the destination channel identifier carried in the channel switching instruction.

After the Wi-Fi STA in the Mobile Wi-Fi switches to the destination communication channel, the Wi-Fi STA in the Mobile Wi-Fi sends information including the destination channel identifier to a Wi-Fi AP in the Mobile Wi-Fi, and controls the Wi-Fi AP in the Mobile Wi-Fi to switch, according to the received information, from a communication channel, which the Wi-Fi AP is currently on, to the destination communication channel corresponding to the destination channel identifier. In other words, once a communication channel of the Wi-Fi hotspot is switched, the Wi-Fi hotspot notifies the Mobile Wi-Fi in time, and then the Wi-Fi STA and Wi-Fi AP in the Mobile Wi-Fi automatically switch to a same destination communication channel as that of the Wi-Fi hotspot.

For example, currently, the Wi-Fi hotspot communicates on a channel 108, and the Wi-Fi STA in the Mobile Wi-Fi connected to the Wi-Fi hotspot also communicates on the channel 108. When the Wi-Fi hotspot detects interference on the current channel, for example, when interference of a radar signal exists, the Wi-Fi hotspot determines an available communication channel 110, and the Wi-Fi hotspot switches the channel to the channel 110 for communication. Meanwhile, the Wi-Fi hotspot generates a channel switching instruction carrying an identifier of the channel 110, and sends the channel switching instruction to the Mobile Wi-Fi. Then, a Wi-Fi chip in the Mobile Wi-Fi parses the received channel switching instruction, and determines the destination channel identifier in the channel switching instruction. The Wi-Fi STA in the Mobile Wi-Fi first obtains the destination channel identifier from the channel switching instruction, and switches, according to the destination channel identifier, to the channel 110 for communication; and the Wi-Fi STA sends the channel switching instruction to the Wi-Fi AP in the Mobile Wi-Fi.

After the Wi-Fi AP in the Mobile Wi-Fi receives the channel switching instruction, the Wi-Fi AP also switches, according to the destination channel identifier, from the communication channel, which the Wi-Fi AP is currently on, to the channel 110 for communication. In this way, the Wi-Fi hotspot in the network, and the Wi-Fi STA and Wi-Fi AP in the Mobile Wi-Fi are all on the same communication channel, thereby improving compatibility, a throughput, and stability of the Mobile Wi-Fi.

Optionally, the Wi-Fi STA and Wi-Fi AP in the Mobile Wi-Fi perform channel switching successively. That is, the Wi-Fi STA in the Mobile Wi-Fi performs the channel switching first, and then the Wi-Fi AP in the Mobile Wi-Fi performs the channel switching. In the embodiment of the present invention, besides this switching manner, the Wi-Fi STA and Wi-Fi AP in the Mobile Wi-Fi may also perform the channel switching simultaneously. That is, when the Mobile Wi-Fi receives the channel switching instruction that carries the destination channel identifier and is sent by the Wi-Fi hotspot in the network, the Mobile Wi-Fi determines, according to the destination channel identifier in the channel switching instruction, the destination communication channel that needs to be switched to, and then the Mobile Wi-Fi simultaneously controls the Wi-Fi STA and the Wi-Fi AP to switch to the destination communication channel corresponding to the destination channel identifier.

After the Wi-Fi AP in the Mobile Wi-Fi also completes the channel switching, the Wi-Fi AP sends a channel switching instruction including the destination channel identifier to a client terminal that accesses the Wi-Fi AP, where the channel switching instruction may instruct the client terminal to switch from a communication channel on which the client terminal communicates with the Mobile Wi-Fi to the destination communication channel.

The Mobile Wi-Fi starts the Wi-Fi AP and Wi-Fi STA in the Mobile Wi-Fi to send data on the destination communication channel.

The Wi-Fi AP and Wi-Fi STA in the Mobile Wi-Fi described in the embodiment of the present invention are integrated in a single Wi-Fi processing chip of the Mobile Wi-Fi, where the Wi-Fi processing chip performs data exchange with the Wi-Fi hotspot and a terminal device in a manner of time division multiplexing.

By means of the channel switching process in the foregoing embodiment, a Wi-Fi hotspot, a Wi-Fi AP, a Wi-Fi STA, and a client terminal are all enabled to keep sending data on a same communication channel, thereby greatly improving compatibility, a throughput, and stability of a Mobile Wi-Fi.

Figure 4:
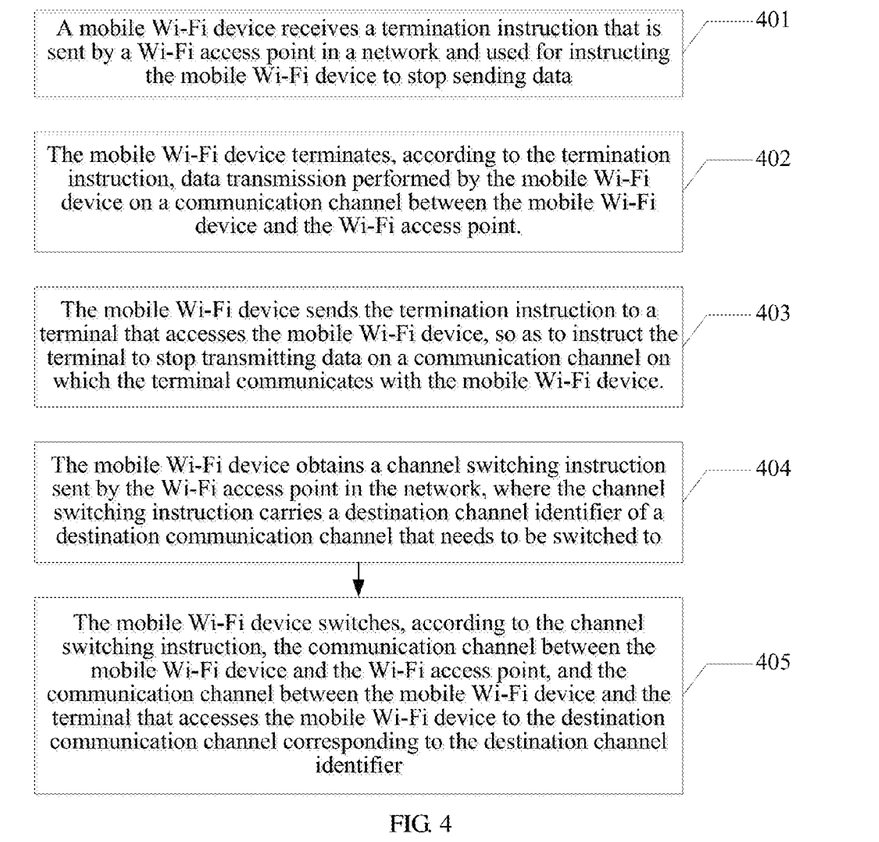
FIG. 4 is a flowchart of another channel switching method according to an embodiment of the present invention.

In addition, another embodiment of the present invention further provides a channel switching method. FIG. 4 is a flowchart of the channel switching method according to the another embodiment of the present invention. The method includes:

S401: A mobile Wi-Fi device receives a termination instruction that is sent by a Wi-Fi access point in a network and used for instructing the mobile Wi-Fi device to stop sending data.

S402: The mobile Wi-Fi device terminates, according to the termination instruction, data transmission performed by the mobile Wi-Fi device on a communication channel between the mobile Wi-Fi device and the Wi-Fi access point.

S403: The mobile Wi-Fi device sends the termination instruction to a terminal that accesses the mobile Wi-Fi device, so as to instruct the terminal to stop transmitting data on a communication channel on which the terminal communicates with the mobile Wi-Fi device.

S404: The mobile Wi-Fi device obtains a channel switching instruction sent by the Wi-Fi access point in the network, where the channel switching instruction carries a destination channel identifier of a destination communication channel that needs to be switched to.

S405: The mobile Wi-Fi device switches the communication channel between the mobile Wi-Fi device and the Wi-Fi access point, and the communication channel between the mobile Wi-Fi device and the terminal that accesses the mobile Wi-Fi device to the destination communication channel corresponding to the destination channel identifier.

Specifically, when detecting that communication channel switching needs to be performed, the Wi-Fi hotspot in the network first sends, to the Mobile Wi-Fi, a termination instruction used for instructing the Mobile Wi-Fi to stop sending data. According to the received termination instruction, the Mobile Wi-Fi terminates data sending, which is performed by a Wi-Fi STA and a Wi-Fi AP included in the Mobile Wi-Fi, on a communication channel that the Wi-Fi STA and Wi-Fi AP included in the Mobile Wi-Fi are currently on. The Wi-Fi AP further sends the termination instruction to the client terminal that accesses the Wi-Fi AP, where the termination instruction is used to instruct the client terminal to stop transmitting data on the communication channel on which the client terminal communicates with the mobile Wi-Fi device.

After data transmission performed by the Mobile Wi-Fi and the terminal is terminated, the Wi-Fi hotspot detects an available communication channel, and instructs the Mobile Wi-Fi to perform communication channel switching. A channel switching process of the Mobile Wi-Fi is the same as that in Embodiment 1 and is not described herein again.

Figure 5:
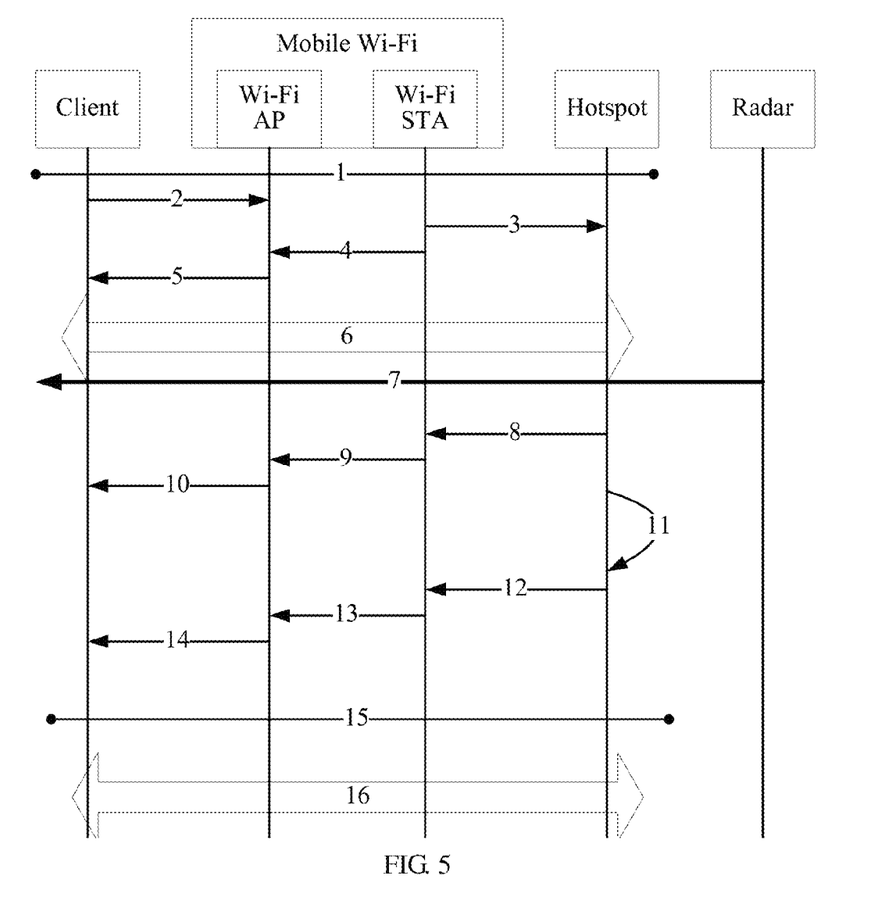
FIG. 5 is a flowchart of interaction of a mobile Wi-Fi device according to an embodiment of the present invention.

The following completely describes a channel switching process by using a flowchart. FIG. 5 is a flowchart of channel switching of a Mobile Wi-Fi according to an embodiment of the present invention. The process includes:

1. The Mobile Wi-Fi is started, a Wi-Fi AP in the Mobile Wi-Fi automatically selects a communication channel 100 and starts to send a Beacon frame, and a Wi-Fi STA in the Mobile Wi-Fi starts to scan a Wi-Fi hotspot in a network.

2. A Client (a terminal) receives the Beacon frame sent by the Wi-Fi AP in the Mobile Wi-Fi, and the Client accesses the Wi-Fi AP, and uses the communication channel 100 to communicate with the Mobile Wi-Fi.

3. The Wi-Fi STA in the Mobile Wi-Fi scans and is connected to the Wi-Fi hotspot in the network, and detects that the Wi-Fi hotspot stays on a channel 108.

4. The Mobile Wi-Fi synchronously sends, to the Wi-Fi AP, received information that the Wi-Fi hotspot camps on the channel 108.

5. The Wi-Fi AP in the Mobile Wi-Fi switches to the channel 108 and is disconnected from the Client, and the Client scans and is connected to the Wi-Fi AP again; or the Wi-Fi AP directly instructs the Client to switch to the channel 108.

6. From the Client to the Mobile Wi-Fi, and then to the Wi-Fi Hotspot all work on the channel 108, and stable connections are established.

7. A radar starts to send a signal on the channel 108.

8. The Wi-Fi hotspot detects signal interference and immediately instructs the Mobile Wi-Fi to stop sending data on the channel 108, and the Wi-Fi hotspot detects whether there is another available channel.

9. The Mobile Wi-Fi controls the Wi-Fi AP and Wi-Fi STA in the Mobile Wi-Fi to stop sending data on the channel 108.

10. The Wi-Fi AP in the Mobile Wi-Fi sends, to the Client, information that data cannot be sent on the channel 108, so as to instruct the Client to stop sending data on the channel 108.

11. The Wi-Fi hotspot detects that a channel 116 is available.

12. The Wi-Fi hotspot sends a channel switching instruction of switching to the channel 116 to the Mobile Wi-Fi.

13. The Mobile Wi-Fi controls the Wi-Fi AP and Wi-Fi STA in the Mobile Wi-Fi to switch to the channel 116.

14. The Wi-Fi AP in the Mobile Wi-Fi instructs the Client to switch to the channel 116.

15. The Client, the Mobile Wi-Fi, and the Wi-Fi hotspot all switch the channel to the channel 116.

16. The whole network starts to work on the channel 116.

In the foregoing process, differences may exist in details of step 8 to step 15 for different providers, a sequence of performing the steps is not limited, but a principle is the same as that of the technical solutions of the present invention. Therefore, a change in details of the steps shall still fall within the scope of the technical solutions of the present invention.

By means of the channel switching process in the foregoing embodiment, a Wi-Fi hotspot, a Wi-Fi AP, a Wi-Fi STA, and a client terminal are all enabled to keep sending data on a same communication channel, thereby greatly improving compatibility, a throughput, and stability of a Mobile Wi-Fi.

Figure 6:
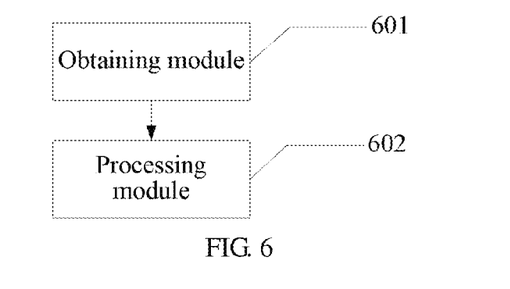
FIG. 6 is a schematic structural diagram of a channel switching apparatus according to an embodiment of the present invention.

Based on a same invention idea, an embodiment of the present invention further provides a channel switching apparatus. The apparatus is applied to a mobile Wi-Fi device with a single Wi-Fi chip. FIG. 6 is a schematic structural diagram of the channel switching apparatus according to the embodiment of the present invention. The channel switching apparatus includes:

an obtaining module 601, configured to obtain, by using a receiver in a mobile Wi-Fi device, a channel switching instruction sent by a Wi-Fi access point in a network, where the channel switching instruction carries a destination channel identifier; and a processing module 602, configured to switch, according to the channel switching instruction, a communication channel between the mobile Wi-Fi device and the Wi-Fi access point, and a communication channel between the mobile Wi-Fi device and a terminal that accesses the mobile Wi-Fi device to a destination communication channel corresponding to the destination channel identifier carried in the channel switching instruction.

Figure 7:
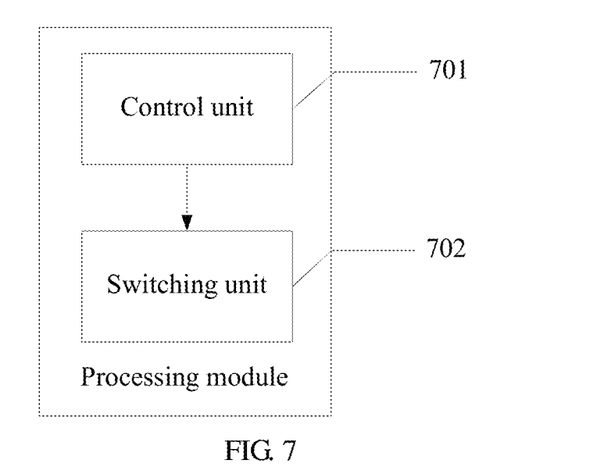
FIG. 7 is a schematic diagram of a specific structure of a processing module according to an embodiment of the present invention.

Further, as shown in FIG. 7, the processing module 602 in the embodiment of the present invention includes:

a control unit 701, configured to control, according to the channel switching instruction, the communication channel between the mobile Wi-Fi device and the Wi-Fi access point to be switched to the destination communication channel corresponding to the destination channel identifier, and generate a switching completion signal; and a switching unit 702, connected to the control unit 701 and configured to switch, according to the switching completion signal, the communication channel between the mobile Wi-Fi device and the terminal that accesses the mobile Wi-Fi device to the destination communication channel corresponding to the destination channel identifier.

Further, in the embodiment of the present invention, the processing module 602 is further configured to: control, according to the channel switching instruction, the communication channel between the mobile Wi-Fi device and the Wi-Fi access point to be switched to the destination communication channel corresponding to the destination communication identifier; and at the same time control the communication channel between the mobile Wi-Fi device and the terminal that accesses the mobile Wi-Fi device to be switched to the destination communication channel corresponding to the destination communication channel identifier.

Further, in the embodiment of the present invention, the obtaining module 601 is further configured to receive, by using the receiver in the mobile Wi-Fi device, a termination instruction that is sent by the Wi-Fi access point in the network and used for instructing the mobile Wi-Fi device to stop transmitting data; and the processing module 602 is further configured to terminate, according to the termination instruction, data transmission performed by the mobile Wi-Fi device on the communication channel between the mobile Wi-Fi device and the Wi-Fi access point.

Further, the processing module 602 in the embodiment of the present invention is further configured to send the termination instruction to the terminal that accesses the mobile Wi-Fi device, so as to instruct the terminal to stop transmitting data on the communication channel on which the terminal communicates with the mobile Wi-Fi device.

Further, in the embodiment of the present invention, the processing module 602 is further configured to send information including the destination channel identifier to the terminal that accesses the mobile Wi-Fi device, where the information is used to instruct the terminal to switch from the communication channel between the terminal and the mobile Wi-Fi device to the destination communication channel corresponding to the destination channel identifier.

Corresponding to a channel switching method in an embodiment of the present invention, an embodiment of the present invention further provides a mobile Wi-Fi device.

Figure 8:
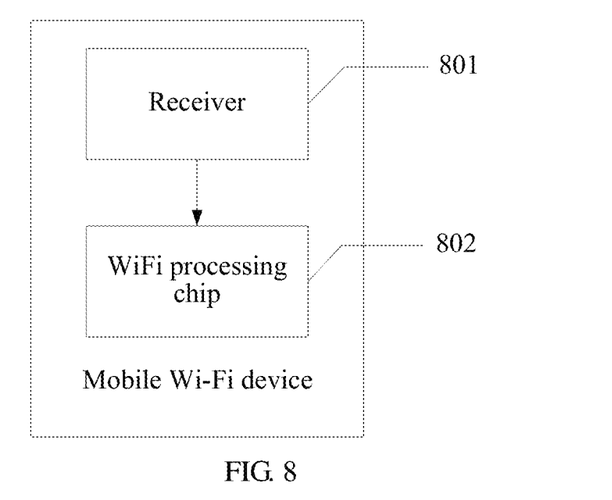
FIG. 8 is a schematic structural diagram of a mobile Wi-Fi device according to an embodiment of the present invention.

FIG. 8 is a schematic structural diagram of the mobile Wi-Fi device according to the embodiment of the present invention. The mobile Wi-Fi device includes:

a receiver 801, configured to obtain a channel switching instruction sent by a Wi-Fi access point in a network, where the channel switching instruction carries a destination channel identifier; and a Wi-Fi processing chip 802, connected to the receiver and configured to switch, according to the channel switching instruction, a communication channel between the mobile Wi-Fi device and the Wi-Fi access point, and a communication channel between the Wi-Fi device and a terminal that accesses the mobile Wi-Fi device to a destination communication channel corresponding to the destination channel identifier carried in the channel switching instruction.

Further, in the embodiment of the present invention, the Wi-Fi processing chip 802 is further configured to: control, according to the channel switching instruction, the communication channel between the mobile Wi-Fi device and the Wi-Fi access point to be switched to the destination communication channel corresponding to the destination channel identifier, and generate a switching completion signal; and switch, according to the switching completion signal, the communication channel between the mobile Wi-Fi device and the terminal that accesses the mobile Wi-Fi device to the destination communication channel corresponding to the destination channel identifier.

Further, in the embodiment of the present invention, the Wi-Fi processing chip 802 is further configured to control, according to the channel switching instruction, the communication channel between the mobile Wi-Fi device and the Wi-Fi access point to be switched to the destination communication channel corresponding to the destination channel identifier; and control the communication channel between the mobile Wi-Fi device and the terminal that accesses the mobile Wi-Fi device to be switched to the destination communication channel corresponding to the destination channel identifier.

Further, in the embodiment of the present invention, the receiver 801 is further configured to receive a termination instruction that is sent by the Wi-Fi access point in the network and used for instructing the mobile Wi-Fi device to stop sending data; and the Wi-Fi processing chip 802 is further configured to terminate, according to the termination instruction, data transmission performed by the mobile Wi-Fi device on the communication channel between the mobile Wi-Fi device and the Wi-Fi access point.

Further, in the embodiment of the present invention, the Wi-Fi processing chip 802 is further configured to send information including the destination channel identifier to the terminal that accesses the mobile Wi-Fi device, where the information is used to instruct the terminal to switch from the communication channel on which the terminal communicates with the mobile Wi-Fi device to the destination communication channel corresponding to the destination channel identifier.

Further, in the embodiment of the present invention, the mobile Wi-Fi device has a single Wi-Fi chip, and the Wi-Fi processing chip 802 in the mobile Wi-Fi device is disposed on the Wi-Fi chip.

In the embodiment of the present invention, a mobile Wi-Fi device obtains a channel switching instruction sent by a Wi-Fi access point in a network, where the channel switching instruction carries a destination channel identifier; and the mobile Wi-Fi device switches a communication channel between the mobile Wi-Fi device and the Wi-Fi access point, and a communication channel between the mobile Wi-Fi device and a terminal that accesses the mobile Wi-Fi device to a destination communication channel corresponding to the destination channel identifier carried in the channel switching instruction, which avoids the problem that a Wi-Fi client and a Wi-Fi access end of a mobile Wi-Fi device are switched to different communication channels when channel switching is performed. The Wi-Fi client and Wi-Fi access end of the mobile Wi-Fi device then still work on a same communication channel after performing the channel switching, thereby improving compatibility, a throughput, and stability of the mobile Wi-Fi device.

The present invention is described with reference to the flowcharts and/or block diagrams of the method and device (system) according to the embodiments of the present invention, and a computer program product. It should be understood that computer program instructions may be used to implement each process and/or each block in the flowcharts and/or block diagrams, and a combination of a process and/or a block in the flowcharts and/or the block diagrams. These computer program instructions may be provided for a general-purpose computer, a dedicated computer, a built-in processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may also be stored in a computer readable memory that can instruct a computer or another programmable data processing device to work in a specified manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed in the computer or the another programmable device, thereby generating computer-implemented processing. Therefore, the instructions executed in the computer or the another programmable device provide steps for implementing a specific function in one or more processes in the flowcharts and/or in one or more blocks in the block diagrams.

Although preferred embodiments of the present invention have been described, persons skilled in the art can make changes and modifications to the embodiments once they learn basic inventive concepts. Therefore, the following claims are intended to be construed as to cover the preferred embodiments and all changes and modifications falling within the scope of the present invention.

Obviously, persons skilled in the art can make various modifications and variations to the present invention without departing from the spirit and scope of the present invention. The present invention is intended to cover these modifications and variations provided that the modifications and variations fall within the scope of protection defined by the following claims and their equivalent technologies.

What is claimed is:

1. A channel switching method, comprising:
   obtaining, by a mobile Wi-Fi device, a channel switching instruction sent by a Wi-Fi access point that provides access to a network, the channel switching instruction carrying a destination channel identifier, and the mobile Wi-Fi device comprising a Wi-Fi client of the Wi-Fi access point and also a second Wi-Fi access point for a terminal to provide access to the network for the terminal by channeling communications to the Wi-Fi access point using the Wi-Fi client; and switching, by the mobile Wi-Fi device according to the channel switching instruction:
- a communication channel between the mobile Wi-Fi device and the Wi-Fi access point to a destination communication channel corresponding to the destination channel identifier, and
- a communication channel between the mobile Wi-Fi device and the terminal that accesses the mobile Wi-Fi device for access to the network to the destination communication channel corresponding to the destination channel identifier by sending a switching instruction to the terminal from the mobile Wi-Fi device.

2. The method according to claim 1, wherein the switching, by the mobile Wi-Fi device according to the channel switching instruction comprises:

controlling, by the mobile Wi-Fi device according to the channel switching instruction, the communication channel between the mobile Wi-Fi device and the Wi-Fi access point to be switched to the destination communication channel corresponding to the destination channel identifier, and generating a switching completion signal; and switching, by the mobile Wi-Fi device according to the switching completion signal, the communication channel between the mobile Wi-Fi device and the terminal that accesses the mobile Wi-Fi device to the destination communication channel corresponding to the destination channel identifier.

3. The method according to claim 1, wherein the switching, by the mobile Wi-Fi device according to the channel switching instruction comprises:

controlling, by the mobile Wi-Fi device according to the channel switching instruction, the communication channel between the mobile Wi-Fi device and the Wi-Fi access point to be switched to the destination communication channel corresponding to the destination channel identifier; and at the same time controlling the communication channel between the mobile Wi-Fi device and the terminal that accesses the mobile Wi-Fi device to be switched to the destination communication channel corresponding to the destination channel identifier.

4. The method according to claim 1, further comprising: before the obtaining the channel switching instruction sent by a Wi-Fi access point:

receiving, by the mobile Wi-Fi device, a termination instruction that is sent by the Wi-Fi access point and used for instructing the mobile Wi-Fi device to stop transmitting data; and terminating, by the mobile Wi-Fi device according to the termination instruction, data transmission performed by the mobile Wi-Fi device on the communication channel between the mobile Wi-Fi device and the Wi-Fi access point.

5. The method according to claim 4, further comprising, after the terminating the data transmission:

sending the termination instruction to the terminal that accesses the mobile Wi-Fi device to instruct the terminal to stop transmitting data on the communication channel on which the terminal communicates with the mobile Wi-Fi device.

6. The method according to claim 1, further comprising: after the switching, by the mobile Wi-Fi device according to the channel switching instruction, sending, by the mobile Wi-Fi device, information comprising the destination channel identifier to the terminal that accesses the mobile Wi-Fi device, wherein the information is used to instruct the terminal to switch from the communication channel on which the terminal communicates with the mobile Wi-Fi device to the destination communication channel corresponding to the destination channel identifier.

7. A channel switching apparatus, comprising:

at least one hardware processor;

a memory interfaced to the at least one hardware processor, the memory including instructions which control the at least one hardware processor to:

obtain, by using a receiver in a mobile Wi-Fi device, a channel switching instruction sent by a Wi-Fi access point that provides access to a network, the channel switching instruction carrying a destination channel identifier, and the mobile Wi-Fi device comprising a Wi-Fi client of the Wi-Fi access point and also a second Wi-Fi access point for a terminal to provide access to the network for the terminal by channeling communications to the Wi-Fi access point using the Wi-Fi client; and switch, according to the channel switching instruction:
- a communication channel between the mobile Wi-Fi device and the Wi-Fi access point to a destination communication channel corresponding to the destination channel identifier, and
- a communication channel between the mobile Wi-Fi device and the terminal that accesses the mobile Wi-Fi device for access to the network to a destination communication channel corresponding to the destination channel identifier carried in the channel switching instruction by sending a switching instruction to the terminal from the mobile Wi-Fi device.

8. The apparatus according to claim 7, wherein the instructions further control the at least one hardware processor to:

control, according to the channel switching instruction, the communication channel between the mobile Wi-Fi device and the Wi-Fi access point to be switched to the destination communication channel corresponding to the destination channel identifier, and generate a switching completion signal; and switch, according to the switching completion signal, the communication channel between the mobile Wi-Fi device and the terminal that accesses the mobile Wi-Fi device to the destination communication channel corresponding to the destination channel identifier.

9. The apparatus according to claim 7, wherein the instructions further control the at least one hardware processor to: control, according to the channel switching instruction, the communication channel between the mobile Wi-Fi device and the Wi-Fi access point to be switched to the destination communication channel corresponding to the destination channel identifier; and at the same time control the communication channel between the mobile Wi-Fi device and the terminal that accesses the mobile Wi-Fi device to be switched to the destination communication channel corresponding to the destination channel identifier.

10. The apparatus according to claim 7, wherein the instructions further control the at least one hardware processor to receive, by using the receiver in the mobile Wi-Fi device, a termination instruction that is sent by the Wi-Fi access point and used for instructing the mobile Wi-Fi device to stop transmitting data; and
terminate, according to the termination instruction, data transmission performed by the mobile Wi-Fi device on the communication channel between the mobile Wi-Fi device and the Wi-Fi access point.

11. The apparatus according to claim 10, wherein the instructions further control the at least one hardware processor to send the termination instruction to the terminal that accesses the mobile Wi-Fi device to instruct the terminal to stop transmitting data on the communication channel on which the terminal communicates with the mobile Wi-Fi device.

12. The apparatus according to claim 7, wherein the instructions further control the at least one hardware processor to send information comprising the destination channel identifier to the terminal that accesses the mobile Wi-Fi device, and the information is used to instruct the terminal to switch from the communication channel on which the terminal communicates with the mobile Wi-Fi device to the destination communication channel corresponding to the destination channel identifier.

13. The apparatus according to claim 7, wherein the channel switching apparatus comprises a channel switching chip.

14. A mobile Wi-Fi device, comprising:
a receiver, configured to obtain a channel switching instruction sent by a Wi-Fi access point which provides access to a network, the channel switching instruction carrying a destination channel identifier; and
a Wi-Fi processing chip, connected to the receiver and configured, according to the channel switching instruction, to switch:
a communication channel between the mobile Wi-Fi device and the Wi-Fi access point to a destination communication channel corresponding to the destination channel identifier carried in the channel switching instruction, and
a communication channel between the mobile Wi-Fi device and a terminal that accesses the mobile Wi-Fi device for access to the network to the destination communication channel corresponding to the destination channel identifier carried in the channel switching instruction by sending a switching instruction to the terminal from the mobile Wi-Fi device.

15. The device according to claim 14, wherein the Wi-Fi processing chip is further configured to: control, according to the channel switching instruction, the communication channel between the mobile Wi-Fi device and the Wi-Fi access point to be switched to the destination communication channel corresponding to the destination channel identifier, and generate a switching completion signal; and
switch, according to the switching completion signal, the communication channel between the mobile Wi-Fi device and the terminal that accesses the mobile Wi-Fi device to the destination communication channel corresponding to the destination channel identifier.

16. The device according to claim 14, wherein the Wi-Fi processing chip is further configured to: control, according to the channel switching instruction, the communication channel between the mobile Wi-Fi device and the Wi-Fi access point to be switched to the destination communication channel corresponding to the destination channel identifier; and control the communication channel between the mobile Wi-Fi device and the terminal that accesses the mobile Wi-Fi device to be switched to the destination communication channel corresponding to the destination channel identifier.

17. The device according to claim 14, wherein the receiver is further configured to receive a termination instruction that is sent by the Wi-Fi access point and used for instructing the mobile Wi-Fi device to stop sending data; and
the Wi-Fi processing chip is further configured to terminate, according to the termination instruction, data transmission performed by the mobile Wi-Fi device on the communication channel between the mobile Wi-Fi device and the Wi-Fi access point.

18. The device according to claim 14, wherein the Wi-Fi processing chip is further configured to send information comprising the destination channel identifier to the terminal that accesses the mobile Wi-Fi device, and the information is used to instruct the terminal to switch from the communication channel on which the terminal communicates with the mobile Wi-Fi device to the destination communication channel corresponding to the destination channel identifier.

19. The device according to claim 14, wherein the mobile Wi-Fi device has a single Wi-Fi processing chip.

* * * * *